United States Patent
An et al.

(10) Patent No.: US 9,896,009 B2
(45) Date of Patent: Feb. 20, 2018

(54) SEAT CUSHION OF VEHICLE

(71) Applicant: HYUNDAI DYMOS INCORPORATED, Seosan-si Chungcheongnam-do (KR)

(72) Inventors: Sung Chol An, Hwaseong-si (KR); Jin Ho Seo, Yongin-si (KR); Chan Uk Park, Gyeongju-si (KR); Myeong Sub Kim, Seongnam-si (KR); Yun Ho Kim, Osan-si (KR); Dong Hwan Kim, Hwaseong-si (KR)

(73) Assignee: HYUNDAI DYMOS INCORPORATED, Seosan-si, Chungcheonhnam-do (KR)

( * ) Notice: Subject to any disclaimer, the term of this patent is extended or adjusted under 35 U.S.C. 154(b) by 0 days.

(21) Appl. No.: 15/309,514

(22) PCT Filed: May 8, 2015

(86) PCT No.: PCT/KR2015/004587
§ 371 (c)(1),
(2) Date: Nov. 8, 2016

(87) PCT Pub. No.: WO2015/170906
PCT Pub. Date: Nov. 12, 2015

(65) Prior Publication Data
US 2017/0151898 A1    Jun. 1, 2017

(30) Foreign Application Priority Data
May 8, 2014   (KR) .................... 10-2014-0054845

(51) Int. Cl.
*B60N 2/64*   (2006.01)
*B60N 2/62*   (2006.01)
*B60N 2/44*   (2006.01)

(52) U.S. Cl.
CPC ............ *B60N 2/64* (2013.01); *B60N 2/4415* (2013.01); *B60N 2/62* (2013.01)

(58) Field of Classification Search
CPC .......... B60N 2/64; B60N 2/4415; B60N 2/62
USPC ..................................... 297/284.11
See application file for complete search history.

(56) References Cited

U.S. PATENT DOCUMENTS 4,629,248 A * 12/1986 Mawbey .................. B60N 2/62
                                                          297/284.11
9,616,776 B1 * 4/2017 Kondrad .............. B60N 2/0284

FOREIGN PATENT DOCUMENTS

| JP | H11-151958 A | 6/1999 |
| JP | 2003-002090 A | 1/2003 |
| JP | 2008-143364 A | 6/2008 |
| JP | 2010-279650 A | 12/2010 |

(Continued)

OTHER PUBLICATIONS

PCT/KR2015/004587, filed May 8, 2015, translation of International Search Report, dated Jul. 6, 2015.

*Primary Examiner* — Anthony D Barfield
(74) *Attorney, Agent, or Firm* — Brinks Gilson & Lione

(57) ABSTRACT

The present disclosure provides a seat cushion of a vehicle, the seat cushion including: a body coupled to a seat cushion; an extension disposed ahead of the body and being movable forward and backward; and an elastic member disposed in a space between the body and the extension and filling in the space between the body and the extension when the extension moves forward.

6 Claims, 2 Drawing Sheets

(56) References Cited

FOREIGN PATENT DOCUMENTS

KR    10-2011-0020965 A    3/2011

\* cited by examiner

[Fig.1]
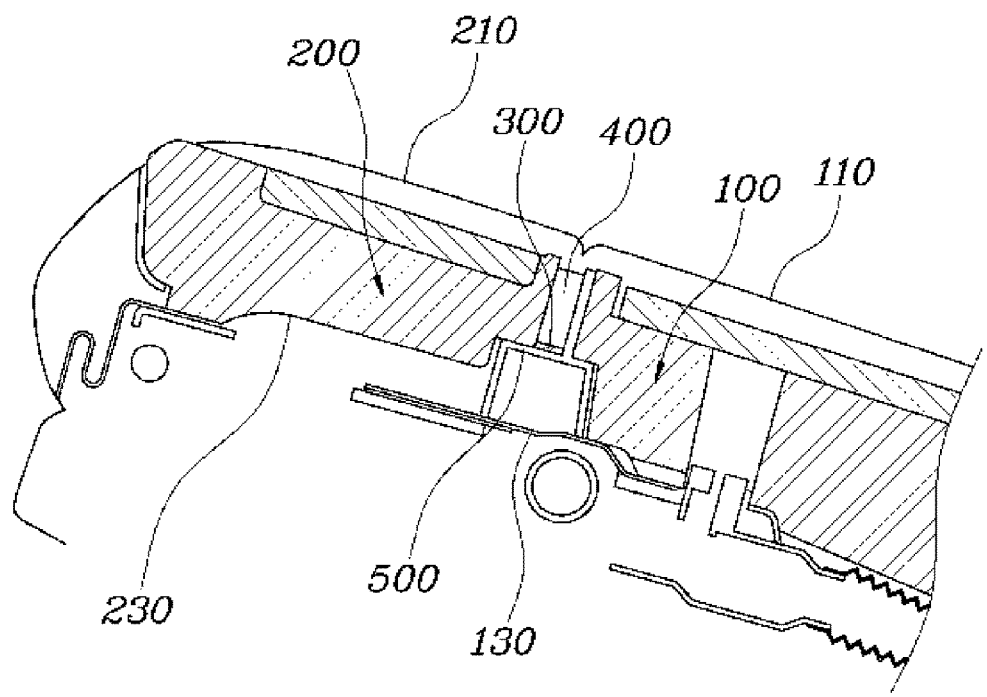

[Fig.2]
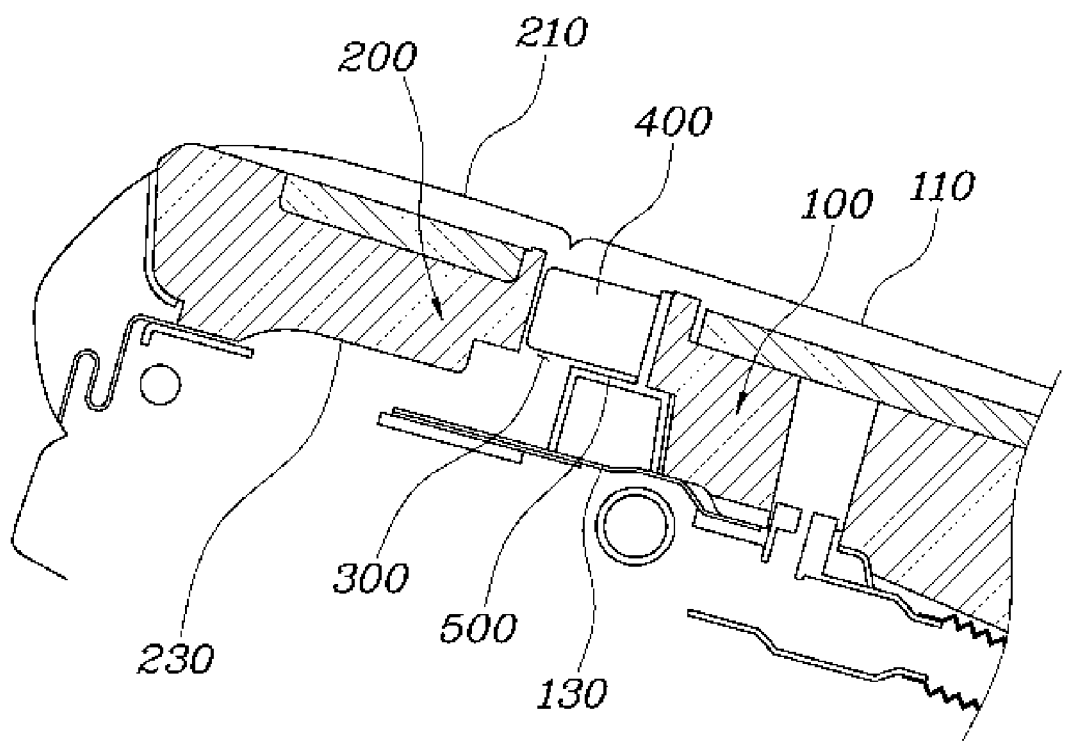

SEAT CUSHION OF VEHICLE

CROSS-REFERENCE TO RELATED APPLICATIONS

This application is a filing under 35 U.S.C. §371 of International Patent Application PCT/KR2015/004587, filed May 8, 2015, and claims the priority to KR 10-2014-0054845, filed May 8, 2014. These applications are incorporated by reference herein in their entirety.

FIELD

The present disclosure relates to a seat cushion of a vehicle and, more particularly, to a seat cushion for a vehicle.

BACKGROUND

Recently, a demand for stable riding comfort by consumers has increased with a rapidly increasing interest in convenient driving of a vehicle. A suspension or a car body that increases running stability of a vehicle may be included in this subject and a demand for comfort of a seat is also included.

Accordingly, seat backs are equipped with bolsters surrounding both sides of a passenger and a device that allows the top of the seat backs to move forward and backward, and seat cushions are equipped with an extension for supporting the thighs of a passenger.

The extension is mounted on a seat cushion in a vehicle to electrically or mechanically extend forward. Korean Patent Application Publication No. 10-2011-0020965A disclosed a "seat cushion extension apparatus" that includes: an operation bracket that is hinged to a cushion frame to be moved forward by the weight of a passenger seating on a seat cushion; an extension frame that is coupled to the cushion frame to move forward from the front of the cushion frame; a power transmission device that couple the operation bracket and the extension frame to each other and provides force for moving forward and returning backward the extension frame when moving forward with the operation bracket; a locking device that is mounted on the cushion frame and the extension frame to restrict the forward and backward movement of the extension frame; and a lever that is disposed on the cushion frame, coupled to the locking device, and pressed in a one-touch manner to operate the locking device.

Even according to this apparatus in the related art, however, we have discovered a problem that when the extension frame moves forward, it is difficult to prevent a gap between the extension frame and the operation bracket and the passenger feels disconnection under his or her thighs due to the gap or his or her thighs are stuck in the gap.

The description provided above as a related art of the present disclosure is just for helping understanding the background of the present disclosure and should not be construed as being included in the related art known by those skilled in the art.

SUMMARY

The present disclosure addresses these problems and provides a seat cushion for a vehicle, the seat cushion including an elastic member that extends and contracts with forward and backward movement of an extension to fill in a gap that is generated when the extension moves forward and backward.

In one form, a seat cushion of a vehicle according to the present disclosure includes: a body coupled to a seat cushion; an extension disposed ahead of the body and being movable forward and backward; and an elastic member disposed in a space between the body and the extension and filling in the space between the body and the extension when the extension moves forward.

The elastic member may be an air bladder filled with gas and having an elastic case.

A plurality of elastic members may be provided in the space and spaced from each other in a lateral direction of the body.

A body cover for covering body may be provided and may extend to fully cover the elastic member when the extension moves forward.

The body cover may be partially made of a material that is elastic such that the material extends forward with the elastic member to cover the elastic member when the extension moves forward, and contracts without wrinkles when the extension returns.

The elastic material may be provided for the position, which covers the elastic member, of the body cover.

A bracket having an end fixed to: a body frame supporting the body or an extension frame supporting the extension, and an another end coupled to the elastic member to support the elastic member in the space, may be further provided in the space.

The bracket may be coupled to the rear side of the elastic member.

According to the seat cushion of a vehicle having the structure described above, since the space is always filled regardless of movement of the extension, it is possible to ensure continuity of the seat surface and prevent a user's thighs or clothes from being stuck in the space.

Since the space is not exposed, the esthetic appearance can be improved.

DRAWINGS

FIG. 1 is a diagram illustrating the configuration of a seat cushion of a vehicle according to one form of the present disclosure; and FIG. 2 is a view showing a state when an extension according to one form of the present disclosure has moved forward.

DETAILED DESCRIPTION

Hereinafter, a seat cushion of a vehicle according to exemplary forms of the present disclosure will be described with reference to the accompanying drawings.

FIG. 1 is a view showing the configuration of a seat cushion of a vehicle according to one form of the present disclosure. The seat cushion of a vehicle includes: a body 100 coupled to a seat cushion; an extension 200 disposed ahead of the body 100 and being movable forward and backward; and an elastic member 400 disposed in a space 300 between the body 100 and the extension 200 and configured to fill in the space 300 between the body 100 and the extension 200 by extending when the extension 200 moves forward. That is, when the extension 200 moves forward, the elastic member 400 is extended forward and fills in the space 300 by its elasticity, and when the extension 200 returns backward, the elastic member 400 is compressed by the extension 200. Accordingly, the elastic member 400 can fill in the space 300, whereby it is possible to inhibit or prevent a user's thighs or clothes from being stuck.

In detail, the body 100 and the extension 200 are each composed of a frame and a seat pad covering the frame. The body 100 has a first end coupled to the seat back and fixed to a car body and the extension 200 is coupled to a second end, which faces the front of the vehicle, of the body 100 to be movable forward and backward. The coupling and operating structure of the extension 200 and the body 100 may be configured similar to those in the related art, for example, having a coupling structure similar to that disclosed in Korean Patent Application Publication No. 10-2011-0020965 A (2011, 3 Apr.), but may be implemented in various ways without being limited thereto.

On the other hand, the elastic member 400 may be an air bladder filled with gas and having an elastic case. The elastic member is filled with gas, so it has large elasticity, and accordingly, it can freely elastically change in shape in accordance with a change in size of the space 300 that is generated when the body 100 moves forward and backward. That is, the elastic member can fill in the space 300 regardless of the size of the space 300, so it can inhibit or prevent a user's thighs and clothes from being stuck.

A plurality of elastic members 400 may be provided in the space 300 and arranged with predetermined intervals in the lateral direction of the body 100, in which gaps are generated among the elastic members 400, so when force is applied to the elastic members 400, the elastic members 400 can be pressed in the lateral direction. Accordingly, the elastic members 400 can more freely change in shape. That is, they can appropriately cope with changes in size of the space 300.

Obviously, only one elastic member 400 may be provided to fully fill in the space 300.

On the other hand, a body cover 110 covering the body 100 is provided and it may extend forward to fully cover the elastic member 400. In other words, the front end of the body cover 110 extends to the front end of the elastic member 400 to fully cover the elastic member 400 so that the elastic members 400 and the space 300 are not exposed to the outside. Accordingly, it is possible to improve the esthetic appearance of the vehicle and prevent a passenger from feeling uncomfortable.

However, since the elastic member 400 repeats extending and contracting forward and backward, the body cover 110 may also extend and contract at least over the extension and contraction range of the elastic member 400. Accordingly, the body cover 110 may partially include a material that is elastic such that it extends forward with the elastic member 400 to cover the elastic member 400 when the extension 200 moves forward and it contracts without wrinkles when the extension 200 returns.

The entire body cover 110 may extend with extension of the elastic member 400 or the material having elasticity may be provided at a position corresponding to the elastic member 400. That is, the body cover 110 may be made of two different materials for the portion covering the body 100 and the portion covering the elastic member 400, thereby making the material of the body cover 110 for the body 100 independent from the elastic member 400.

Further, an extension cover 210 covering the extension 200 may be further provided and the body cover 110 may be connected to the extension cover 210, so when the extension 200 moves forward, the body cover 110 may be pulled to extend by the extension cover 210. Obviously, the front end of the body cover 110 may be coupled to the elastic member 400 to extend with movement of the elastic members 400.

On the other hand, a bracket 500 of which an end is fixed to a body frame 130 supporting the body 100 or an extension frame 230 for the extension 200 and that is coupled to the elastic member 400 to support the elastic member 400 in the space 300 may be further provided in the space 300.

In detail, the bracket 500 has a lower end coupled and fixed to the body frame 130 or the extension frame 230, and an upper end coupled to the elastic member 400 to support the elastic member 400 within the space 300. Obviously, the position where the lower end of the bracket 500 is fixed is limited thereto, that is, not the lower end, but the middle portion of the bracket 500 may be fixed at the position. The position is not limited.

Further, the elastic member 400 and the bracket 500 can be combined in various structures, but the upper end of the bracket 500 is coupled to the rear side of the elastic member 400 to support the elastic member 400, whereby it is possible to avoid limiting the amount of extension and contraction of the elastic member 400 due to limit in a lateral change in shape by the bracket 500 when the elastic member 400 extends or contracts in the front-rear direction.

According to the seat cushion of a vehicle having the structure described above, since it is possible to fill in the space 300 regardless of movement of the extension 200, so it is possible to provide continuity of the seat surface and prevent a user's thighs or clothes from being stuck in the space 300. And it is also possible to inhibit or prevent a passenger from feeling uncomfortable, and accordingly, it is possible to improve the commercial value of the seat.

Since the space 300 is not exposed, the esthetic appearance can be improved.

Although the present disclosure was described with reference to specific forms shown in the drawings, it is apparent to those skilled in the art that the present disclosure may be changed and modified in various ways without departing from the scope of the present disclosure.

The invention claimed is:
1. A seat cushion of a vehicle, comprising:
a body coupled to a seat back;
an extension disposed ahead of the body and configured to move forward and backward;
an elastic member disposed in a space between the body and the extension, and configured to contract when the extension moves backward and to extend when the extension moves forward, such that the elastic member fills in the space between the body and the extension, and
a bracket disposed in the space and having first and second ends, the bracket coupled to a rear side of the elastic member,
wherein the first end is fixed to a body frame supporting the body or an extension frame supporting the extension, and the second end is coupled to the elastic member to support the elastic member in the space.
2. The seat cushion of claim 1, wherein the elastic member is an air bladder filled with gas and having an elastic case.
3. The seat cushion of claim 1, wherein a plurality of elastic members are provided in the space and spaced from each other in a lateral direction of the body.
4. The seat cushion of claim 1, wherein a body cover configured to cover body is provided and the body cover is configured to extend to fully cover the elastic member when the extension moves forward.

5. The seat cushion of claim 4, wherein an entire or a portion of the body cover is made of a material that is elastic such that the material extends forward with the elastic member to cover the elastic member when the extension moves forward, and contracts without wrinkles when the extension returns backward.

6. The seat cushion of claim 5, wherein a portion, which is configured to cover the elastic member, of the body cover is made of the elastic material.

\* \* \* \* \*